(12) United States Patent
Kunz (10) Patent No.: US 11,572,267 B2
(45) Date of Patent: Feb. 7, 2023

(54) FUEL DELIVERY SYSTEM HAVING PRINTED CIRCUIT CORROSION SENSOR

(71) Applicant: Veeder-Root Company, Simsbury, CT (US)

(72) Inventor: Donald A. Kunz, South Windsor, CT (US)

(73) Assignee: Veeder-Root Company, Simsbury, CT (US)

( * ) Notice: Subject to any disclaimer, the term of this patent is extended or adjusted under 35 U.S.C. 154(b) by 0 days.

(21) Appl. No.: 17/377,127

(22) Filed: Jul. 15, 2021

(65) Prior Publication Data

US 2022/0017356 A1    Jan. 20, 2022

Related U.S. Application Data

(60) Provisional application No. 63/053,149, filed on Jul. 17, 2020.

(51) Int. Cl.
*B67D 7/32* (2010.01)
*G01N 27/12* (2006.01)
(Continued)

(52) U.S. Cl.
CPC ................. *B67D 7/32* (2013.01); *B67D 7/04* (2013.01); *G01N 17/02* (2013.01); *G01N 27/12* (2013.01)

(58) Field of Classification Search
CPC . B67D 7/04; B67D 7/32; G01N 17/02; G01N 27/12
See application file for complete search history.

(56) References Cited

U.S. PATENT DOCUMENTS 3,104,355 A    9/1963  Holmes et al.
3,936,737 A    2/1976  Jefferies, Sr.
(Continued)

OTHER PUBLICATIONS

Abstract from Department of Energy Technical Report: "Characterization of Corrosion Probe Coupons Exposed in Tank 241-AN-107," dated Dec. 16, 2003, accessed from https://www.osti.gov/biblio/820849 on Mar. 3, 2020, all enclosed pages cited.

(Continued)

*Primary Examiner* — Timothy L Maust
(74) *Attorney, Agent, or Firm* — Nelson Mullins Riley & Scarborough LLP (57) ABSTRACT

A fuel dispensing system comprising a fuel tank adapted to contain a quantity of fuel. A fuel dispenser is in fluid communication with the fuel tank via piping. A pump operative to transfer fuel from the fuel tank to the fuel dispenser is also provided. The fuel dispensing system further comprises a corrosion detection assembly operative to identify presence of a corrosive substance in the fuel. The corrosion detection assembly includes at least one corrosion sensor positioned to be in contact with fuel vapor in the fuel dispensing system, the corrosion sensor producing a detector signal indicating presence of the corrosive substance. The corrosion sensor according to this aspect has a printed circuit multilayer structure in which at least one sensing element is positioned on an exposed surface of the multilayer structure and at least one reference element is positioned on an inner surface of the multilayer structure to be unexposed to the fuel vapor. Electronics in electrical communication with the corrosion sensor are operative to interpret the detector signal and produce an output if the corrosive substance is present.

25 Claims, 6 Drawing Sheets

(51) Int. Cl.
*B67D 7/04* (2010.01)
*G01N 17/02* (2006.01)

(56) References Cited

U.S. PATENT DOCUMENTS

| | | | |
|---|---|---|---|
| 4,186,605 | A | 2/1980 | Bourigault |
| 5,070,024 | A | 12/1991 | Bruno |
| 5,288,147 | A | 2/1994 | Schaefer et al. |
| 5,954,080 | A | 9/1999 | Leatherman |
| 6,258,253 | B1 | 7/2001 | Davis |
| 6,435,204 | B2 | 8/2002 | White et al. |
| 6,946,855 | B1 | 9/2005 | Hemblade |
| 7,034,553 | B2 | 4/2006 | Gilboe |
| 8,291,928 | B2 | 10/2012 | Reid et al. |
| 8,770,237 | B2 | 7/2014 | Bolt et al. |
| 9,428,375 | B2 | 8/2016 | Sabo et al. |
| 9,521,754 | B1 * | 12/2016 | Bergman ............... H05K 1/185 |
| 9,604,838 | B2 | 3/2017 | Cornett et al. |
| 9,739,512 | B2 | 8/2017 | Roa |
| 10,641,640 | B2 * | 5/2020 | Oh ......................... G01N 33/22 |
| 11,034,573 | B2 * | 6/2021 | Bevins ................ B67D 7/0498 |
| 2002/0164836 | A1 | 7/2002 | Ho |
| 2006/0018762 | A1 | 1/2006 | Aisenbrey |
| 2007/0131864 | A1 | 6/2007 | Ellis et al. |
| 2009/0195260 | A1 | 8/2009 | Bell et al. |
| 2009/0311772 | A1 | 12/2009 | Quinn |
| 2010/0295565 | A1 * | 11/2010 | Drack ................... G01F 23/263 |
| | | | 324/693 |
| 2013/0047963 | A1 | 2/2013 | Horsting |
| 2014/0116138 | A1 | 5/2014 | Sheverev et al. |
| 2014/0202580 | A1 | 7/2014 | Hutchinson |
| 2017/0350747 | A1 * | 12/2017 | Oh ......................... G01N 33/22 |
| 2018/0257925 | A1 * | 9/2018 | Schultz ................. B67D 7/766 |
| 2019/0062142 | A1 | 2/2019 | Bevins et al. |

OTHER PUBLICATIONS

Collection of abstracts obtained from "ScienceDirect Topics: Electrical Resistance Probe," dated 2002, 2011, 2014, 2016, 2017, 2017, 2018, and 2019, accessed from https://www.sciencedirect.com/topics/engineering/electrical-resistance-probe on Mar. 3, 2020, all enclosed pages cited.

Cosasco "High Sensitivity Atmospheric Corrosion Electrical Resistance (ER) Sensor, Model 610" brochure, dated Aug. 28, 2017, all enclosed pages cited.

Cosasco "Electrical Resistance (ER) Probes, Model 2500/2500HT" brochure, dated Jan. 31, 2019 all enclosed pages cited.

Cosasco Press Release "Rohrback Coasasco Systems (RCS) launches new Handheld Portable Corrosion Data Collection system, Checkmate (TM) DL, suitable for data collection in hazardous areas," dated Feb. 6, 2006, all enclosed pages cited.

T.P. Wang, "Thermocouple Materials," ASM International, 1990, all enclosed pages cited.

"Introducing the New Model ECM (TM) Environmental Condition Monitor;" Rohrback Cosasco Systems; Press Release; Aug. 17, 2005.

"Model ER1000 Electrical Resistance Probe with ½" NPT Pipe Plug and Loop Element;" Metal Samples; Data Sheet; retrieved Mar. 2020 from https://www.alspi.com/er1000.htm.

"ANSI and IEC Color Codes for Thermocouples, Wire and Connectors;" Omega; retrieved Mar. 2020 from https://assets.omega.com/pdf/test-and-measurement-equipment/temperature/sensors/thermacouple-probes/tc_colorcodes.pdf.

International Search Report and Written Opinion for corresponding International Application No. PCT/US21/41949, dated Oct. 21, 2021.

* cited by examiner

FUEL DELIVERY SYSTEM HAVING PRINTED CIRCUIT CORROSION SENSOR

PRIORITY CLAIM

This application is based upon and claims the benefit of U.S. Provisional Patent Application No. 63/053,149, filed Jul. 17, 2020, which is incorporated fully herein by reference for all purposes.

BACKGROUND

The present invention relates generally to equipment used in fuel dispensing environments. More specifically, the present invention relates to a fuel delivery system having the capability of detecting the presence of corrosives that might lead to reliability and maintenance issues.

As is well known, liquid fuel delivery systems typically include one or more fuel dispensers located in the forecourt area of a service station. The fuel dispensers are connected via piping with a source of the liquid fuel (e.g., a tank containing gasoline). Typically, the piping is located under the forecourt so that the liquid fuel can be fed from an underground storage tank (UST). Multiple USTs may be provided for different types or grades of fuel. Fuel grades can be mixed as necessary or desired to yield still further grades of fuel.

Modern fueling environments may store liquid fuels which are mixtures of gasoline and ethanol in various ratios, rather than "pure" gasoline. For example, E10 is a liquid fuel comprising 90% gasoline and 10% ethanol. As small amounts of water enter the storage tank containing a gasoline/ethanol mixture, the ethanol absorbs the water. Alternative fuels such as low sulfur diesel and biodiesel are also becoming more common.

The introduction of various alternative and pollution reducing fuels (e.g., fuels with ethanol oxygenate) has created the potential for corrosion in fuel dispensing systems (especially when the fuel does not have a biological reducing inhibitor such as sulfur or includes a biologically supportive substance, such as ethanol). When it occurs, corrosion can result in an interruption of fueling operations, loss of sales, and possible damage.

SUMMARY

The present invention recognizes and addresses various considerations of prior art constructions and methods. According to one embodiment, the present invention provides a fuel dispensing system comprising a fuel tank adapted to contain a quantity of fuel. A fuel dispenser is in fluid communication with the fuel tank via piping. A pump operative to transfer fuel from the fuel tank to the fuel dispenser is also provided.

The fuel dispensing system further comprises a corrosion detection assembly operative to identify presence of a corrosive substance in the fuel. The corrosion detection assembly includes at least one corrosion sensor positioned to be in contact with fuel vapor in the fuel dispensing system, the corrosion sensor producing a detector signal indicating presence of the corrosive substance. The corrosion sensor according to this aspect has a printed circuit multilayer structure in which at least one sensing element is positioned on an exposed surface of the multilayer structure and at least one reference element is positioned on an inner surface of the multilayer structure to be unexposed to the fuel vapor. Electronics in electrical communication with the corrosion sensor are operative to interpret the detector signal and produce an output if the corrosive substance is present.

In some exemplary embodiments, the corrosion sensor may comprise first and second sensing elements on opposite outer surfaces of the multilayer structure. Embodiments are also contemplated wherein the corrosion sensor comprises first and second reference elements on respective inner surfaces of the multilayer structure. The various sensing elements and reference elements may each be formed as a metallic plate on a respective surface of the multilayer structure.

In some exemplary embodiments, the multilayer structure may comprise a plurality of substrate boards adhered together such that the inner surfaces will be unexposed to the fuel vapor. For example, the substrate boards may be constructed of glass fiber and epoxy. The corrosion detection assembly may further have a plurality of electronic components which, along with the sensing element(s) and the reference element(s), form a constant current arrangement whereby changes in the sensing element(s) due to corrosion cause a change in detected output voltage.

In some exemplary embodiments, the corrosion sensor may be located in an upper portion of the fuel tank above a maximum fuel level. In some exemplary embodiments, the pump may be a submersible turbine pump (STP) with the corrosion sensor being located in an STP sump. In some exemplary embodiments, the corrosion sensor may be located in a fuel dispenser sump located below the fuel dispenser. The at least one corrosion sensor may comprise a plurality of corrosion sensors at different locations in the fuel dispensing system.

In some exemplary embodiments, the electronics may comprise an analog-to-digital converter operative to receive the detector signal in analog form and produce a digital output and comparator circuitry. The comparator circuitry may preferably comprise a processor and memory. At least a portion of the electronics may be incorporated into a tank monitor device in electrical communication with a level gauge in the fuel tank.

Another aspect of the present invention provides a corrosion detection assembly for use in a fuel dispensing system. The corrosion detection assembly comprises at least one corrosion sensor positioned to be in contact with fuel vapor in the fuel dispensing system, the corrosion sensor producing a detector signal indicating presence of the corrosive substance. The corrosion sensor according to this aspect has a printed circuit multilayer structure in which at least one sensing element is positioned on an exposed surface of the multilayer structure and at least one reference element is positioned on an inner surface of the multilayer structure to be unexposed to the fuel vapor. The at least one sensing element and the at least one reference element are each formed as a metallic plate on a respective surface of the multilayer structure. The multilayer structure has a plurality of substrate boards adhered together such that the inner surface will be unexposed to the fuel vapor during use.

A still further aspect of the present invention provides a fuel dispensing system comprising a fuel tank adapted to contain a quantity of fuel. A fuel dispenser in fluid communication with the fuel tank via piping is also provided. A pump is operative to transfer fuel from the fuel tank to the fuel dispenser.

The fuel dispensing system further comprises a corrosion detection assembly operative to identify presence of a corrosive substance in the fuel. The corrosion detection assembly has at least one corrosion sensor positioned to be in contact with fuel vapor in the fuel dispensing system, the corrosion sensor having at least one sensing element exposed to the fuel vapor and at least one reference element unexposed to the fuel vapor. Along with the sensing element and the reference element, a plurality of electronic components form a constant current arrangement whereby changes in the at least one sensing element due to corrosion cause a change in detected output voltage. Electronics in electrical communication with the corrosion sensor are also provided. The electronics are operative to interpret the detector output voltage and produce an output if the corrosive substance is present.

Another aspect of the present invention provides a corrosion detection assembly comprising at least one corrosion sensor producing a detector signal indicating presence of a corrosive substance. The corrosion sensor is constructed having a printed circuit multilayer structure in which at least one sensing element is positioned on an exposed surface of the multilayer structure and at least one reference element is positioned on an inner surface of the multilayer structure to be unexposed to the corrosive substance. The at least one sensing element and the at least one reference element are each formed as a metallic plate on a respective surface of the multilayer structure. In addition, the multilayer structure has a plurality of substrate boards adhered together such that the interior surface will be unexposed to the corrosive substance during use. Electronics are in electrical communication with the corrosion sensor, the electronics being operative to interpret the detector signal and produce an output if the corrosive substance is present.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof directed to one skilled in the art, is set forth in the specification, which makes reference to the appended drawings, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the present disclosure including the appended claims and their equivalents.

Certain fueling systems, particularly those that dispense fuel without a biological reducing inhibitor or fuel that includes a biologically supportive substance, may experience excessive or accelerated corrosion. The corrosion is often caused by the presence of bacteria that may be introduced into the fuel from the surrounding environment. For example, the bacteria may react with ethanol in the fuel to produce acid (e.g., acetic acid) that has a deleterious effect on equipment of the fuel dispensing system. Embodiments of this invention provide a corrosion detection assembly that can be used to detect presence of the corrosive substance so that remedial action can be taken.

Figure 1:
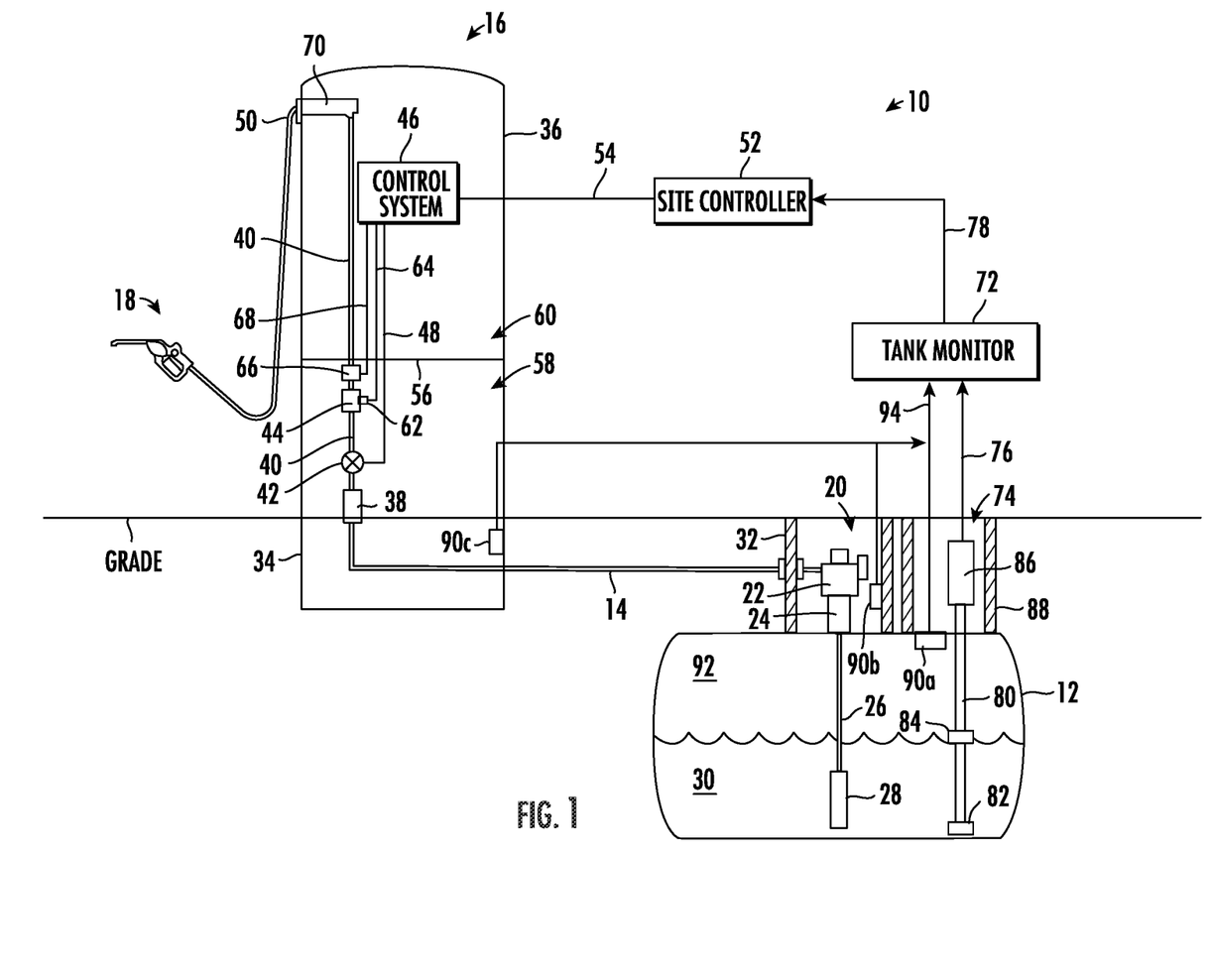
FIG. 1 is a diagrammatic representation of fuel dispensing system including a corrosion detection assembly in accordance with an embodiment of the present invention.

In this regard, FIG. 1 is a diagrammatic representation of a fuel dispensing system 10 in a retail service station environment according to an aspect of the present invention. In general, fuel may travel from an underground storage tank (UST) 12 via main fuel piping 14, which may be a double-walled pipe having secondary containment as is well known, to fuel dispenser 16 and nozzle 18 for delivery. An exemplary underground fuel delivery system is illustrated in U.S. Pat. No. 6,435,204, hereby incorporated by reference in its entirety for all purposes.

More specifically, a submersible turbine pump (STP) 20 associated with the UST 12 is used to pump fuel to the fuel dispenser 16. (In some embodiments, the fuel dispenser may be self-contained, meaning that fuel is drawn to the fuel dispenser by a pump unit positioned within the fuel dispenser housing.) STP 20 comprises a distribution head 22 containing power and control electronics that provide power through a riser 24 down to a boom 26, eventually reaching a turbine pump contained inside an outer turbine pump housing 28. STP 20 may preferably be the RED JACKET® submersible turbine pump, manufactured by the Veeder-Root Co. of Simsbury, Conn. There may be a plurality of USTs 12 and STPs 20 in a service station environment if more than one type or grade of fuel 30 is to be delivered by a fuel dispenser 16.

The turbine pump operates to draw fuel 30 upward from the UST 12 into the boom 26 and riser 24 for delivery to the fuel dispenser 16. After STP 20 draws the fuel 30 into the distribution head 22, the fuel 30 passes to main fuel piping 14. Distribution head 22 is located in an STP sump 32 adapted to capture any leaked fuel 30 that drains from distribution head 22 so that fuel 30 is not leaked into the ground. Main fuel piping 14 carries fuel 30 through dispenser sump 34 to fuel dispenser 16 for eventual delivery. Dispenser sump 34 is adapted to capture any leaked fuel 30 that drains from fuel dispenser 16 and its fuel handling components so that fuel 30 is not leaked into the ground.

Main fuel piping 14 may then pass into housing 36 of fuel dispenser 16 through a shear valve 38. As is well known, shear valve 38 is designed to close the fuel flow path in the event of an impact to fuel dispenser 16. U.S. Pat. No. 8,291,928, hereby incorporated by reference in its entirety for all purposes, discloses an exemplary secondarily-contained shear valve adapted for use in service station environments. Shear valve 38 contains an internal fuel flow path to carry fuel 30 from main fuel piping 14 to internal fuel piping 40.

After fuel 30 exits the outlet of shear valve 38 and enters into internal fuel piping 40, it may encounter a flow control valve 42 positioned upstream of a flow meter 44. (In some fuel dispensers, valve 42 may be positioned downstream of the flow meter 44.) In one embodiment, valve 42 may be a proportional solenoid controlled valve, such as described in U.S. Pat. No. 5,954,080, hereby incorporated by reference in its entirety for all purposes.

Flow control valve 42 is under control of a control system 46 via a flow control valve signal line 48. In this manner, control system 46 can control the opening and closing of flow control valve 42 to either allow fuel to flow or not flow through meter 44 and on to the hose 50 and nozzle 18. Control system 46 may be any suitable electronics with associated memory and software programs running thereon whether referred to as a processor, microprocessor, controller, microcontroller, or the like (which are intended herein as equivalent terms). In a preferred embodiment, control system 46 may be comparable to the microprocessor-based control systems used in CRIND type units sold by Gilbarco Inc. Control system 46 typically controls other aspects of fuel dispenser 16, such as valves, displays, and the like as is well understood. For example, control system 46 typically instructs flow control valve 42 to open when a fueling transaction is authorized. In addition, control system 46 may be in electronic communication with a site controller 52 via a fuel dispenser communication network 54. Communication network 54 may be any suitable link, such as two wire, RS 422, Ethernet, wireless, etc. as needed or desired. Site controller 52 communicates with control system 46 to control authorization of fueling transactions and other conventional forecourt control activities. For example, the site controller functions may be provided by the PASSPORT® point-of-sale system manufactured by Gilbarco Inc. or by a separate forecourt controller.

The memory of control system 46 (and other memories discussed herein) may be any suitable memory or computer-readable medium as long as it is capable of being accessed by the control system, including random access memory (RAM), read-only memory (ROM), erasable programmable ROM (EPROM), or electrically EPROM (EEPROM), CD-ROM, DVD, or other optical disk storage, solid-state drive (SSD), magnetic disc storage, including floppy or hard drives, any type of suitable non-volatile memories, such as secure digital (SD), flash memory, memory stick, or any other medium that may be used to carry or store computer program code in the form of computer-executable programs, instructions, or data. Control system 46 may also include a portion of memory accessible only to control system 46.

Flow control valve 42 is contained below a vapor barrier 56 in a hydraulics compartment 58 of fuel dispenser 16. Control system 46 is typically located in an electronics compartment 60 of fuel dispenser 16 above vapor barrier 56. After fuel 30 exits flow control valve 42, it typically flows through meter 44, which preferably measures the flow rate of fuel 30. In some embodiments, meter 44 may be capable of measuring the density and/or temperature of the flowing fuel. Flow meter 44 may be any suitable flow meter known to those of skill in the art, including positive displacement, inferential, and Coriolis mass flow meters, among others. Meter 44 typically comprises electronics 62 that communicate information representative of the flow rate, density, and/or temperature of fuel to control system 46 via a signal line 64. For example, electronics 62 may typically include a pulser as known to those skilled in the art. In this manner, control system 46 can update the total gallons (or liters) dispensed and the price of the fuel dispensed on an information display of fuel dispenser 16.

As fuel leaves flow meter 44 it enters a flow switch 66. Flow switch 66, which preferably comprises a one-way check valve that prevents rearward flow through fuel dispenser 16, generates a flow switch communication signal via flow switch signal line 68 to control system 46 to communicate when fuel 30 is flowing through flow meter 44. The flow switch communication signal indicates to control system 46 that fuel is actually flowing in the fuel delivery path and that subsequent signals from flow meter 44 are due to actual fuel flow.

After fuel 30 enters flow switch 66, it exits through internal fuel piping 40 to be delivered to a blend manifold 70. Blend manifold 70 receives fuels of varying octane levels from the various USTs and ensures that fuel of the octane level selected by the customer is delivered. After flowing through blend manifold 70, fuel 30 passes through fuel hose 50 and nozzle 18 for delivery to the customer's vehicle.

UST 12 includes an automatic tank gauge (ATG) system to monitor level of fuel 30. The ATG system includes a tank monitor 72 in electrical communication with a probe 74 (e.g., a magnetostrictive probe) such as via an appropriate signal line 76. In turn, tank monitor 72 is in electrical communication with site controller 52, such as via signal line 78. Preferably, tank monitor 72 is a microprocessor-based system having suitable program instructions stored in memory to perform the desired functions. For example, tank monitor 72 may comprise the TLS-450 or TLS-350 systems manufactured by Veeder-Root Company.

Probe 74 includes a probe shaft 80 that extends through the interior of UST 12, as shown. A water level float 82 and fuel level float 84 are able to slide along the shaft 80 as the liquid levels change. In particular, water level float 82 floats on the water-fuel interface so that the level of water in the bottom of UST 12 can be detected. If the water level exceeds a threshold (such as if it is too near the inlet of pump housing 28), operation of STP 20 can be interrupted. Fuel level float 84 floats on top of fuel 30 so that the amount of fuel in UST 12 can be determined.

As shown, probe 74 includes an electronics head 86 at the end of probe shaft 80, located external to UST 12 in a well 88. Head 86 generates signals provided to tank monitor 72 that are indicative of the locations of floats 82 and 84. In an example embodiment, probe 74 may comprise the Mag Plus magnetostrictive probe system manufactured by Veeder-Root Company.

Fuel dispensing system 10 further comprises a corrosion detection assembly that is operative to detect the presence of a corrosive substance that may otherwise lead to premature corrosion within the fuel dispensing system. As will be explained, the corrosive detection assembly preferably includes at least one corrosion sensor 90 situated in an electrolytic vapor environment within the fuel dispensing system. In this regard, evaporation of liquid fuel produces fuel vapor at various locations in the fuel dispensing system.

A corrosive substance in the fuel will also be present in the vapor, where it is detected by the corrosion sensor 90 as described more fully below.

In the illustrated embodiment, for example, a first corrosion sensor 90a is located in the ullage 92 of UST 12 at a location above the highest expected level of fuel 30. As is well known, hydrocarbon vapors produced by evaporation of fuel 30 will be located in ullage 92. If a corrosive substance is present in the vapor, sensor 90a produces a signal that can be detected by suitable circuitry such as suitably programmed circuitry of tank monitor 72. Toward this end, sensor 90a is in electrical communication with tank monitor 72 via a corresponding signal line 94. In addition, or in the alternative, one or more corrosion sensors may be situated in other locations in the fuel dispensing system. For example, the illustrated embodiment includes a corrosion sensor 90b in STP sump 32 and/or a corrosion sensor 90c in dispenser sump 34.

Figure 2:
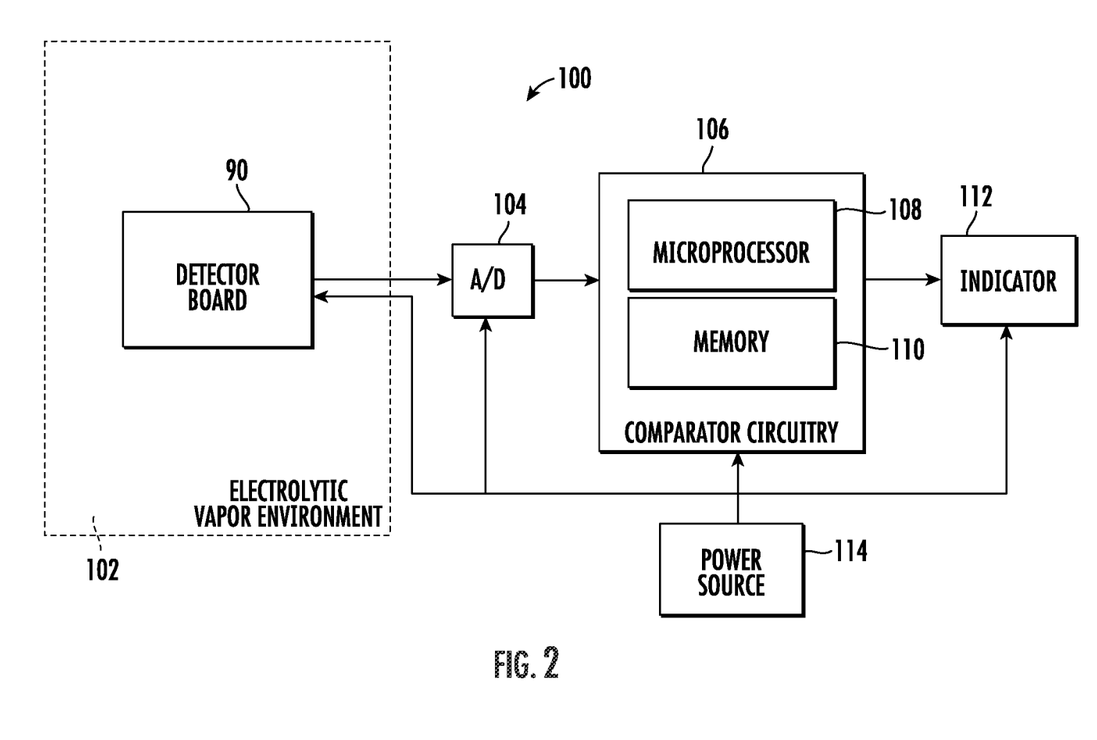
FIG. 2 is a diagrammatic representation showing certain components of a corrosion detection assembly in accordance with an embodiment of the present invention.

Referring now to FIG. 2, certain additional details regarding an exemplary corrosion detection assembly 100 of the present invention can be most easily explained. As shown, corrosion sensor 90 is situated in a vapor environment 102, which will be electrolytic in the presence of the corrosive substance. As a result, a signal indicating presence of the corrosive substance will be produced by sensor 90 (the sensor is referred to in this drawing as a "detector board"). While analog processing is possible within the scope of the present invention, the analog output of sensor 90 is sampled and converted to a digital signal in the illustrated embodiment via a suitable analog-to-digital (A/D) converter 104. The output of A/D converter 104 is fed to comparator circuitry 106, which in this embodiment includes a microprocessor 108 and associated memory 110. Microprocessor 108 executes suitable program instructions to interpret the digitized signals from sensor 90.

If presence of the corrosive substance is detected, a signal indicative thereof can be provided to indicator 112 which may be any suitable device, circuitry, computer program, or other indicator that can be used to act upon the presence of the corrosive substance. For example, indicator 112 may be a visual or audible indicator to inform an operator that the corrosive substance is present. In addition or in the alternative, indicator 112 may comprise a computer program that continuously tracks the amount of corrosive substance and generates action at the appropriate time. As noted above, at least some circuitry of corrosion detection assembly 100 may be incorporated into tank monitor 72. For example, tank monitor 72 can be programmed to perform the functions described in relation to FIG. 2 in addition to other functions normally performed by tank monitor 72. One or more power sources 114 provides power to the various components of assembly 100.

Figure 3:
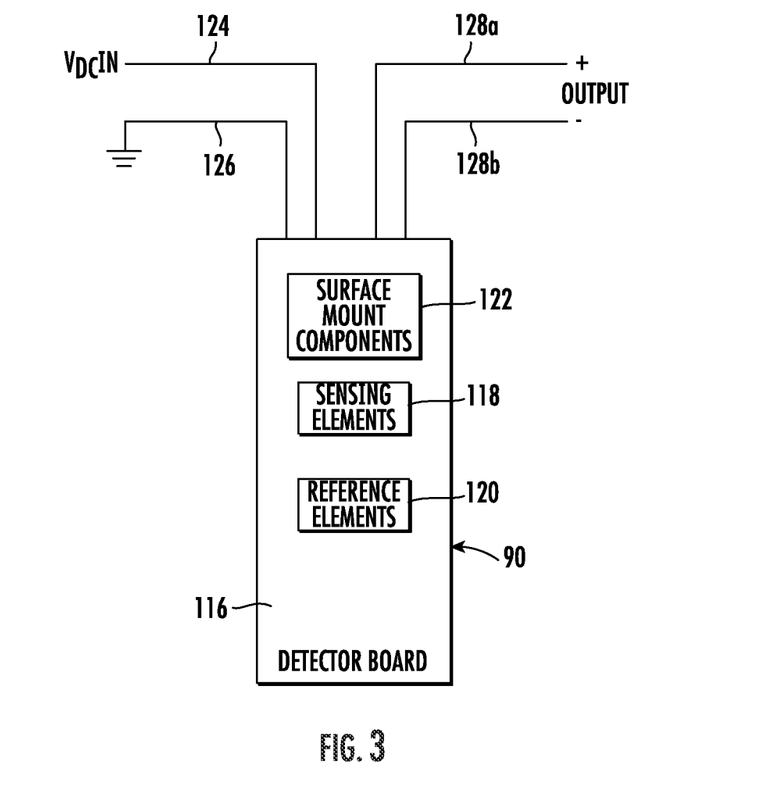
FIG. 3 is a diagrammatic representation of an exemplary corrosion sensor that may be used with the corrosion detection assembly of FIG. 2.

Certain aspects of a preferred implementation of corrosion sensor 90 can be explained with reference to FIG. 3. In this case, corrosion sensor 90 comprises a multilayer printed circuit board 116 carrying various other components that together operate to detect the presence of the corrosive substance. Generally, these other components include sensing element(s) 118, reference element(s) 120, and various surface mount components 122. Elements 118 and 120, and surface mount components 122, are suitably interconnected for electrical communication, such as by vias through board 116 and/or surface traces deposited on board 116. Terminal contacts are also preferably provided to allow external connection to sensor 90, such as power lead 124, ground lead 126, and detection leads 128a-b.

Figure 4A:
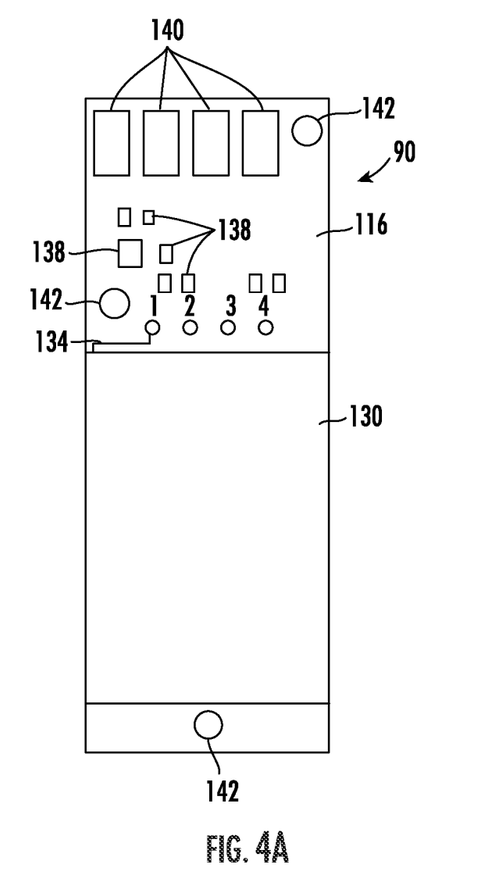
FIGS. 4A and 4B are top and bottom diagrammatic plan views of an exemplary corrosion sensor that may be used with the corrosion detection assembly of FIG. 2.
Figure 4B:
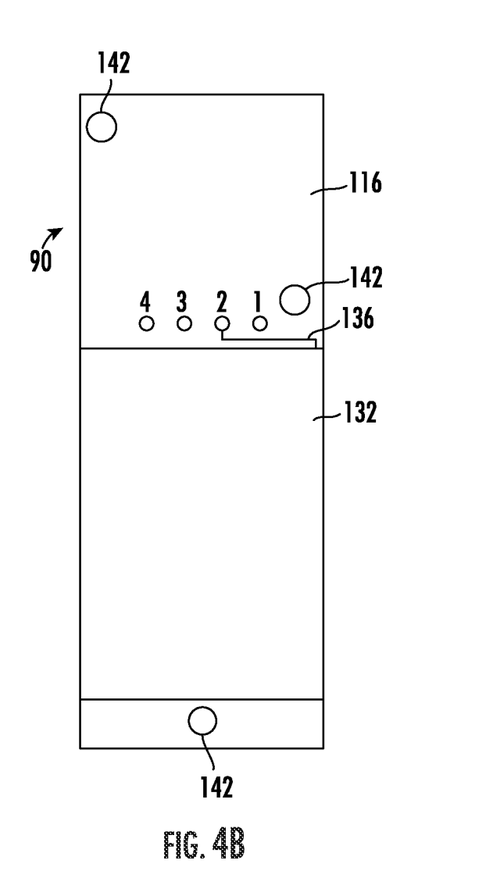

FIGS. 4A and 4B respectively show top and bottom sides of board 116. In this embodiment, board 116 has a first sensing element 130 formed as a large conductive area on its top surface and a second sensing element 132 formed as a large conductive area on its bottom surface. Because the sensing elements are located on outer surfaces of the circuit board, they will be exposed to the fuel vapor in the fuel delivery system. Presence of the corrosive substance will cause detectable degradation of the sensing elements. As can be seen, conductive traces 134 and 136 are respectively associated with the sensing elements 130 and 132. In this embodiment, traces 134 and 136 extend to conductive vias that pass through board 116 to provide electrical communication as necessary to complete the circuit. (These vias are denoted "1" and "2," respectively. Other vias are denoted "3" and "4")

Referring now specifically to FIG. 4A, certain additional details regarding the construction of sensor 90 can be most easily explained. In this example, a plurality of electrical components (e.g., those indicated at 138, such as one or more diodes, transistors, resistors, etc.) are mounted to the surface of board 116. A plurality of terminal contacts 140 are also located on board 116 for attachment of external connections. For example, the contacts may be configured as metallic pads formed on the top surface of a substrate board by electroplating or any other suitable deposition technique. One or more holes 142 may be provided through board 116 to facilitate mounting of sensor 90 in a desired location.

Figure 5:
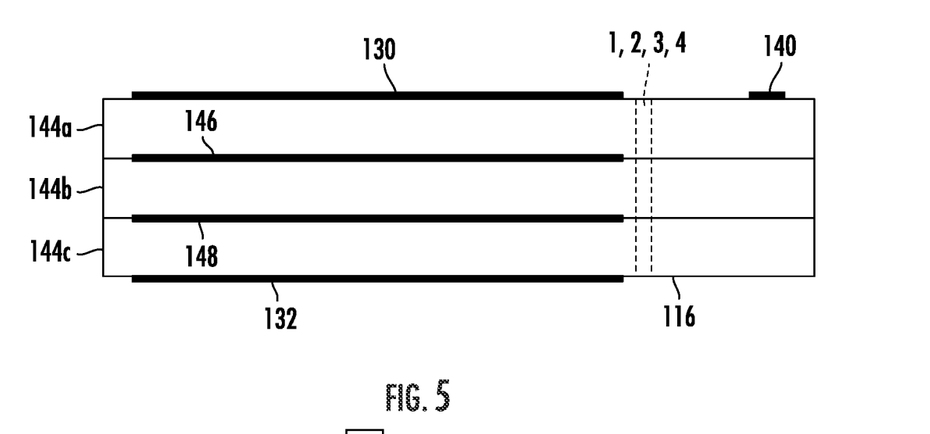
FIG. 5 is a diagrammatic side view of an exemplary corrosion sensor that may be used with the corrosion detection assembly of FIG. 2 showing various layers of a printed circuit multilayer structure.

FIG. 5 shows the multilayer structure of board 116. In this exemplary embodiment, board 116 comprises three substrate boards 144a, 144b, and 144c that are sandwiched together as shown. Each of substrate boards 144a, 144b, and 144c comprises a separate circuit board substrate (e.g., formed of glass fibers and epoxy) on which the desired conductive elements are formed. The multilayer structure is then assembled by stacking substrates 144a, 144b, and 144c and adhering them together, such as by epoxy. As a result, the interior of the multilayer structure will not be exposed to the fuel vapor when sensor 90 is in use.

At least one reference element is preferably located inside of the multilayer structure to be protected from the corrosive substance. In this embodiment, for example, first and second reference elements 146 and 148 are located on the top and bottom surfaces of inner substrate 144b, respectively. For example, reference elements 146 and 148 may have a size (i.e., surface area and thickness) similar to the initial size of sensing elements 130 and 132 and are preferably formed of the same conductive material. The circuitry compares the manner in which corrosive degradation changes sensing elements 130 and 132, while reference elements 146 and 148 are not changed because they do not experience corrosive degradation.

In a preferred embodiment, the sensing and reference elements may be formed of copper that is applied to the respective substrate surface by electroplating or any other suitable forms of deposition. As one skilled in the art will appreciate, the size of the sensing and reference elements is preferably chosen so as to achieve the best combination of sensitivity and service life. Preferably, the resistance of the sensing and reference elements should be identical (or nearly so) at the time of manufacture. Having the reference element(s) compensates the measurement for things that affect the actual measured resistance, e.g., temperature.

The use of printed techniques to produce the sensing and reference elements provides highly repeatable and consistent performance. The sensing and reference elements may be deposited in a trace having a serpentine pattern or the like, which is nevertheless considered a "plate" for present purposes because it exists in the same plane. The board traces, the spacing, the composition of the corrosion sensing traces, the thickness of the PC material and the type of PC material can be changed to suit the characteristics required for the sensor. For practical reasons the widths and spacings of the sensing traces may be limited to numbers like one-thousandth of an inch (or larger). The trace width and spacing between traces are not required to be the same. Again, these things can be modified to make a sensor with the desired characteristics. In many embodiments, the PC board may have a size of about one to twenty square inches. For example, the board may be a little under ten square inches and have trace widths and spacings of ten-thousandths of an inch.

Figure 6:
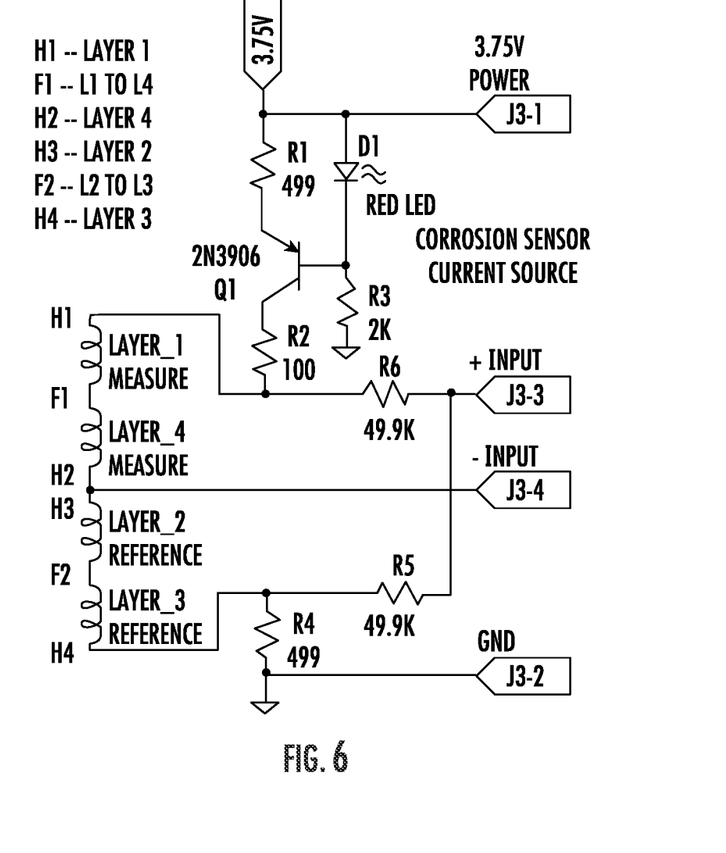
FIG. 6 is a schematic diagram of an exemplary corrosion sensor that may be used with the corrosion detection assembly of FIG. 2.

FIG. 6 shows a schematic diagram of sensor 90 in accordance with an exemplary embodiment. Sensing elements 130 and 132 are denoted "Layer_1" and "Layer_4," respectively. Reference elements 146 and 148 are denoted "Layer_2" and "Layer_3," respectively. The sensing and reference elements appear as resistors in the circuit, which is in this case powered by a 3.75 $V_{DC}$ source.

Operation of this example circuit will now be described. The actual current source is made up of R1, D1, Q1 and R3. As noted, the circuit is powered by 3.75 $V_{DC}$. R3 causes a current of approximately 1.0 milliamps to flow through the parallel circuitry of: (a) R1 in series with the base of Q1 and (b) LED diode D1. The voltage on the base of Q1 and the cathode of D1 will be about 2.0 volts. This will cause there to be a voltage drop of about 1.0 volts across R1. This is the basis for the current source. Because there is one volt across R1, the current flowing through R1 (499 ohms) will be about two milliamps. The current flowing out of the collector of transistor Q1 will also be about two milliamps. Hence, the current source is about two milliamps.

The red LED has a voltage drop of about 1.7 volts. (The LED is red in this case because different LED colors have somewhat different voltage drops and 1.7 volts is convenient. Also, the temperature coefficient of both the transistor and red LED are very similar, which is desirable.) The emitter-base (base-emitter) junction of the transistor has a voltage drop of about 0.7 volts. The difference between the two voltage drops, i.e., one volt, is the voltage that is across the resistor R1.

The current that is to be passed through the sensor elements affects the corrosion rate somewhat. For the purposes of the envisioned fueling environment, two milliamps has been determined to be a reasonable number. But, within reason, any current could be used. Next, the two milliamps flow through R2, the 100 ohm resistor. It then flows through the sensing and reference elements—Layer_1, Layer_4, Layer_2, and Layer_3. The current continues on through R4, the 499 ohm resistor, which is connected go ground.

To sense and measure the current, R6 is connected to the "top" of the sensing elements and R5 is connected to the "bottom" of the reference elements. R6 and R5 along with a connection to the "middle" of the elements connects directly to the measuring circuitry (not shown). Note that the current through R6 and R5 is negligible in this example because the sensing resistances are on the order of fifty ohms and R6 and R5 are about one-thousand times larger in this example. Connecting the two together allows for the analog circuitry to automatically measure the difference between the sensing and reference elements. Otherwise, resistors R6 and R5 could independently connect to the measuring circuitry—and there would be no "error" current. In fact, embodiments are contemplated in which R6 and R5 are not included and the connections between the sensing and reference elements and the measuring circuitry would be direct—without any series resistance. This allows independent measurements of the sensing and reference elements. Independent measurement of the sensing and reference elements allows for mathematically correcting for resistance changes due to things such as temperature which may give better accuracy.

The illustrated arrangement allows measurements of both the sensing elements and reference elements to be made simultaneously with identical current flowing through each of the elements. As a result, measurement is simple and accurate.

Figure 7:
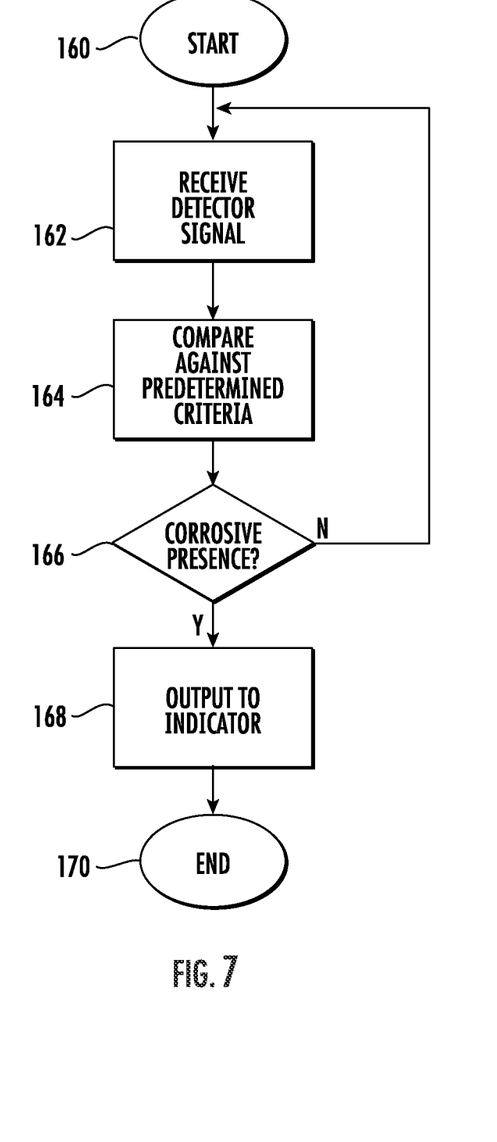
FIG. 7 is a flow chart showing steps of a method in accordance with the present invention of determining presence of a corrosive substance in a fuel dispensing system.

Referring now to FIG. 7, a method in accordance with the present invention of determining presence of a corrosive substance in a fuel dispensing system is illustrated. For example, the illustrated method may be practiced by program instructions running on the processor of tank monitor 72. After the process starts (as indicated at 160), detector signals (e.g., voltage signals from sensor(s) 90) are received (as indicated at 162). This signal information is then compared against predetermined criteria (as indicated at 164). If the comparison shows presence of a corrosive and/or the severity of the corrosive (as indicated at step 166), an output is made to the indicator 112 (as shown at step 168). Otherwise, the process loops back for another comparison. The process ends at step 170.

It can thus be seen that embodiments of the present invention provide a novel corrosive detection assembly which may be used in connection with a fuel delivery system or in other environments where detection of a corrosive substance is desired. While one or more preferred embodiments of the invention have been described above, it should be understood that any and all equivalent realizations of the present invention are included within the scope and spirit thereof. For example, while a circuit with constant current is shown above, a PC Board sensor in accordance with this invention could be driven with a constant voltage or another source of power. For example, the sensor trace could be on glass, with the reference trace on the opposite side of the glass. The reference trace could then be encased in another sheet (sheet 2) of glass using any appropriate sealing material. Another sensor trace could then be provided on the outer side of sheet 2.

Thus, the embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A fuel dispensing system comprising:
a fuel tank adapted to contain a quantity of fuel;
a fuel dispenser in fluid communication with said fuel tank via piping;
a pump operative to transfer fuel from said fuel tank to said fuel dispenser; and
a corrosion detection assembly operative to identify presence of a corrosive substance in said fuel, said corrosion detection assembly having:
at least one corrosion sensor positioned to be in contact with fuel vapor in said fuel dispensing system, said corrosion sensor producing a detector signal indicating presence of the corrosive substance;

said corrosion sensor having a printed circuit multilayer structure in which at least one sensing element is positioned on an exposed surface of the multilayer structure and at least one reference element is positioned on an inner surface of the multilayer structure to be unexposed to the fuel vapor, wherein the multilayer structure comprises a plurality of substrate boards adhered together and the at least one reference element is sandwiched between two of the substrate boards; and electronics in electrical communication with said corrosion sensor, said electronics being operative to interpret said detector signal and produce an output if the corrosive substance is present.

2. A fuel dispensing system as set forth in claim 1, wherein said corrosion sensor comprises first and second sensing elements on opposite outer surfaces of the multilayer structure.

3. A fuel dispensing system as set forth in claim 1, wherein said corrosion detection assembly further has a plurality of electronic components mounted on the multilayer structure.

4. A fuel dispensing system as set forth in claim 3, wherein the electronic components, the at least one sensing element, and the at least one reference element form a constant current arrangement whereby changes in the at least one sensing element due to corrosion cause a change in detected output voltage.

5. A fuel dispensing system as set forth in claim 1, wherein said corrosion detection assembly further has a plurality of electronic components which, along with the at least one sensing element and the at least one reference element, form a constant current arrangement whereby changes in the at least one sensing element due to corrosion cause a change in detected output voltage.

6. A fuel dispensing system as set forth in claim 1, wherein the corrosion sensor is located in an upper portion of the fuel tank above a maximum fuel level.

7. A fuel dispensing system as set forth in claim 1, wherein said pump is a submersible turbine pump (STP) and said corrosion sensor is located in an STP sump.

8. A fuel dispensing system as set forth in claim 1, wherein said corrosion sensor is located in a fuel dispenser sump located below said fuel dispenser.

9. A fuel dispensing system as set forth in claim 1, wherein said at least one corrosion sensor comprises a plurality of said corrosion sensors at different locations in said fuel dispensing system.

10. A fuel dispensing system as set forth in claim 1, wherein said electronics comprise an analog-to-digital converter operative to receive said detector signal in analog form and produce a digital output and comparator circuitry.

11. A fuel dispensing system as set forth in claim 10, wherein said comparator circuitry comprises a processor and memory.

12. A fuel dispensing system as set forth in claim 1, wherein at least a portion of said electronics are incorporated into a tank monitor device in electrical communication with a level gauge in said fuel tank.

13. A fuel dispensing system, comprising:
a fuel tank adapted to contain a quantity of fuel;
a fuel dispenser in fluid communication with said fuel tank via piping;
a pump operative to transfer fuel from said fuel tank to said fuel dispenser; and a corrosion detection assembly operative to identify presence of a corrosive substance in said fuel, said corrosion detection assembly having:
at least one corrosion sensor positioned to be in contact with fuel vapor in said fuel dispensing system, said corrosion sensor producing a detector signal indicating presence of the corrosive substance;
said corrosion sensor having a printed circuit multilayer structure in which at least one sensing element is positioned on an exposed surface of the multilayer structure and at least one reference element is positioned on an inner surface of the multilayer structure to be unexposed to the fuel vapor;
electronics in electrical communication with said corrosion sensor, said electronics being operative to interpret said detector signal and produce an output if the corrosive substance is present;
wherein said corrosion sensor comprises first and second sensing elements on opposite outer surfaces of the multilayer structure; and
wherein said corrosion sensor comprises first and second reference elements on respective inner surfaces of the multilayer structure.

14. A fuel dispensing system as set forth in claim 13, wherein said first and second sensing elements and said first and second reference elements are each formed as a metallic plate on a respective surface of the multilayer structure.

15. A fuel dispensing system as set forth in claim 13, wherein the multilayer structure comprises a plurality of substrate boards adhered together such that the inner surfaces will be unexposed to the fuel vapor.

16. A fuel dispensing system as set forth in claim 15, wherein the substrate boards are constructed of glass fiber and epoxy.

17. A corrosion detection assembly for use in a fuel dispensing system, said corrosion detection assembly comprising:
at least one corrosion sensor positioned to be in contact with fuel vapor in said fuel dispensing system, said corrosion sensor producing a detector signal indicating presence of the corrosive substance;
said corrosion sensor having a printed circuit multilayer structure in which first and second sensing elements are located on opposite exposed surfaces of the multilayer structure and at least one reference element is positioned on an inner surface of the multilayer structure to be unexposed to the fuel vapor;
the sensing elements and the at least one reference element each being formed as a metallic plate on a respective surface of the multilayer structure; and
the multilayer structure having a plurality of substrate boards adhered together to form an integrated structure such that the inner surface will be inside the integrated structure and unexposed to the fuel vapor during use.

18. A corrosion detection assembly as set forth in claim 17, wherein the substrate boards are constructed of glass fiber and epoxy.

19. A corrosion detection assembly as set forth in claim 17, wherein said corrosion detection assembly further has a plurality of electronic components which, along with the at least one sensing element and the at least one reference element, form a constant current arrangement whereby changes in the at least one sensing element due to corrosion cause a change in detected output voltage.

20. A corrosion detection assembly as set forth in claim 17, further comprising electronics in electrical communication with said corrosion sensor, said electronics being operative to interpret said detector signal and produce an output if the corrosive substance is present.

21. A corrosive detection assembly as set forth in claim 20, wherein said electronics comprise an analog-to-digital converter operative to receive said detector signal in analog form and produce a digital output and comparator circuitry.

22. A corrosive detection assembly as set forth in claim 21, wherein said comparator circuitry comprises a processor and memory.

23. A corrosion detection assembly for use in a fuel dispensing system, said corrosion detection assembly comprising:
    at least one corrosion sensor positioned to be in contact with fuel vapor in said fuel dispensing system, said corrosion sensor producing a detector signal indicating presence of the corrosive substance;
    said corrosion sensor having a printed circuit multilayer structure in which at least one sensing element is positioned on an exposed surface of the multilayer structure and at least one reference element is positioned on an inner surface of the multilayer structure to be unexposed to the fuel vapor;
    the at least one sensing element and the at least one reference element each being formed as a metallic plate on a respective surface of the multilayer structure; and
    the multilayer structure having a plurality of substrate boards adhered together such that the inner surface will be unexposed to the fuel vapor during use;
    wherein said corrosion sensor comprises first and second sensing elements on opposite outer surfaces of the multilayer structure; and
    wherein said corrosion sensor comprises first and second reference elements on opposite inner surfaces of the multilayer structure.

24. A fuel dispensing system comprising:
    a fuel tank adapted to contain a quantity of fuel;
    a fuel dispenser in fluid communication with said fuel tank via piping;
    a pump operative to transfer fuel from said fuel tank to said fuel dispenser; and
    a corrosion detection assembly operative to identify presence of a corrosive substance in said fuel, said corrosion detection assembly having:
        at least one corrosion sensor positioned to be in contact with fuel vapor in said fuel dispensing system, said corrosion sensor having at least one sensing element exposed to the fuel vapor and at least one reference element unexposed to the fuel vapor;
        said corrosion sensor having a printed circuit multilayer structure in which at least one sensing element is positioned on an exposed surface of the multilayer structure and at least one reference element is positioned on an inner surface of the multilayer structure to be unexposed to the fuel vapor, the multilayer structure having a plurality of substrate boards adhered together to form an integrated sandwich structure such that the inner surface will be unexposed to the fuel vapor during use;
        a plurality of electronic components which, along with the at least one sensing element and the at least one reference element, form a constant current arrangement whereby changes in the at least one sensing element due to corrosion cause a change in detected output voltage; and
        electronics in electrical communication with said corrosion sensor, said electronics being operative to interpret said detector output voltage and produce an output if the corrosive substance is present.

25. A corrosion detection assembly comprising:
    at least one corrosion sensor producing a detector signal indicating presence of a corrosive substance;
    said corrosion sensor having a printed circuit multilayer structure in which at least one sensing element is positioned on an exposed surface of the multilayer structure and at least one reference element is positioned on an inner surface of the multilayer structure to be unexposed to the corrosive substance;
    the at least one sensing element and the at least one reference element each being formed as a metallic plate on a respective surface of the multilayer structure;
    the multilayer structure having a plurality of substrate boards adhered together such that the inner surface will be unexposed to the corrosive substance during use and the at least one reference element is sandwiched between two of the substrate boards; and
    electronics in electrical communication with said corrosion sensor, said electronics being operative to interpret said detector signal and produce an output if the corrosive substance is present.

* * * * *